Oct. 29, 1968   J. B. THOMPSON ET AL   3,408,169

PAN GRANULATION

Filed May 31, 1967   2 Sheets-Sheet 1

INVENTORS
JOSHUA B. THOMPSON
GORDON C. HILDRED

BY *Arne J. Fors*

Agent

United States Patent Office 3,408,169
Patented Oct. 29, 1968

3,408,169
PAN GRANULATION
Joshua Beaumont Thompson, Trail, British Columbia, and Gordon Charles Hildred, Calgary, Alberta, Canada, assignors to Cominco Ltd., a corporation of Canada
Continuation-in-part of application Ser. No. 371,658, June 1, 1964. This application May 31, 1967, Ser. No. 648,526
7 Claims. (Cl. 23—313)

ABSTRACT OF THE DISCLOSURE

The disclosure of the invention relates to a pan granulating process in which an inclined circular pan rotated about its axis is operated to form a slow moving bed in its lower portion for classification of particles therein for discharge of relatively large particles as product and withdrawal of relatively small particles for the formation of a shallow layer of closely packed particles constituting a zone of fast moving particles. Cooled particles fed to the zone of fast moving particles at a controlled rate for temperature control constitute, with the fast moving particles, solid nuclei onto which a molten, substantially anhydrous nitrogenous compound is sprayed at a predetermined temperature. Solidification of succesive layers of molten material by cooling of the particles results in the formation of hard, coarse and spherical granules.

Cross reference to related applications

This application is a continuation-in-part of application Ser. No. 371,658 filed June 1, 1964 and now abandoned.

Background of the invention

This invention relates to a process for the production of granules of nitrogenous compounds and is particularly directed to a process for the production of such granules by means of pan granulators.

Processes are known for the production of granules by means of pan or dish granulation techniques such as that disclosed in Canadian Patent No. 579,205 issued July 7, 1959 but such known processes suffer from the inherent disadvantage of requiring the use of water for agglomeration of finely divided solids by adhesive action to form granules of the desired size. The water introduced for agglomeration of the particles must subsequently be removed by evaporation. It will be evident that the provision of sufficient heat to evaporate as much as 9%, by weight, or more of added moisture from the granules adds to the overall cost of the process. Also, dried granules initially containing 9% or more moisture are found to be porous and friable.

Processes are also known for the production of pellets in a rotary drum such as disclosed in United States Patents Nos. 2,436,766 and 2,436,771, both issued Feb. 24, 1948. These patents, exemplary of the pelletizing art, describe the operation of a rotary drum wherein a zone of slow moving particles of restricted circulation and sparse concentration is formed in the interior of a deep bed of particles by rotation of the drum at its cascading speed. A liquid such as water, an aqueous solution or a molten mass of the material treated is fed into this relatively hollow and partially restricted region below the surface of the rotating mass to provide a relatively plastic zone in which the particles and liquid gradually agglomerate to form pellets. The pellets produced in a rotary drum by the agglomeration processes are in effect a plurality of particles cemented together to form agglomerates of irregular physical structure and shape. Also, such rotary drums provide a long retention time and contain a large volume of particles, therefore requiring relatively costly supports and auxiliary equipment compared with pan granulators, with which a relatively small amount of material is in process at a given time.

Summary of the invention

We have found that the disadvantages inherent in known processes and the pellets and granules produced thereby can be substantially obviated by the process of the present invention. We have discovered that by applying substantially anhydrous, molten nitrogenous compounds in the form of a spray to cooled solid nuclei and other particles constituting a zone of fast moving solid particles formed into a shallow layer of closely packed particles on the face of an inclined rotating pan by rotating said pan at a rate sufficient to withdraw and deflect particles from a slow moving bed of solid particles into said zone of fast moving particles, to coat the particles results in the production of solid spherical granules which, upon subsequent cooling, are harder, coarser and more uniformly sized and have a significantly lower moisture content than granules produced by known processes.

In general, the present pan granulation process comprisses the steps of spraying a molten, substantially anhydrous nitrogenous compound onto solid nuclei and other particles in an inclined rotating pan whereby the individual particles are built up in size by solidification of succesive layers of molten material to form spherical granules, classifying granules within the pan and discharging relatively large granules from the pan. The process then involves passing said discharged granules to a cooler for cooling by contact with a counter-current flow of cool air, screening the cooled granules, crushing oversized material and recycling said crushed material together with undersized material as cooled solid nuclei to the pan, passing granules within the desired size range of, for example, minus 6 plus 14 mesh, Standard Tyler Screen, to a conditioning step for treatment with an anti-caking agent, and passing the conditioned granules to bagging stations or to storage.

It is, therefore, a principal object of the present invention to provide hard, coarse, substantially moisture-free, uniformly sized granules of nitrogenous compounds. It is another object of the present invention to provide a simple process for the production of granules from nitrogenous compounds with a minimum of attendant dust losses.

Brief description of the drawing

The operation of the process and the manner in which the objects can be attained will become apparent from the following detailed description of the drawing, in which.

Like reference characters refer to like parts throughout the description and the drawing.

Description of the preferred embodiments

Figure 1:
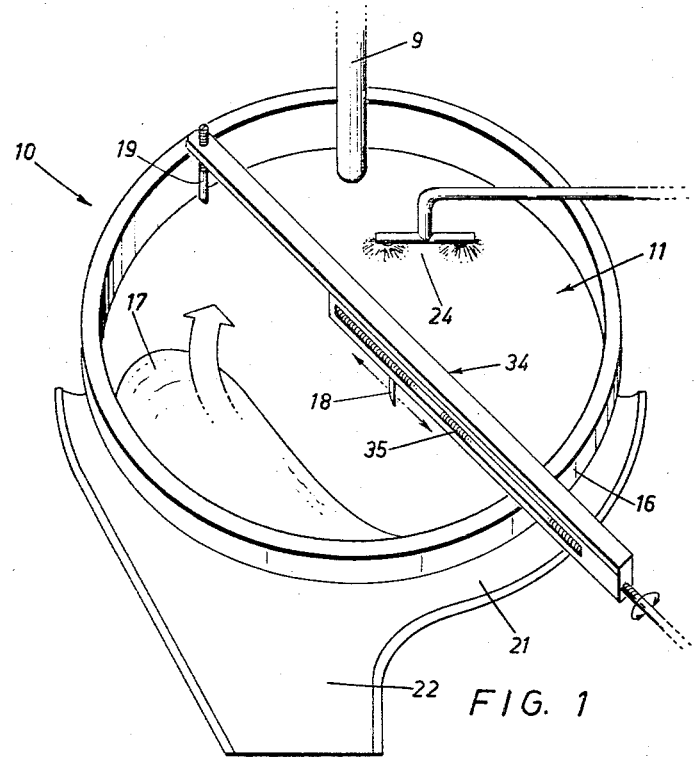
FIGURE 1 is a perspective view of an embodiment of a pan granulator apparatus employed in the process of the present invention.
Figure 2:
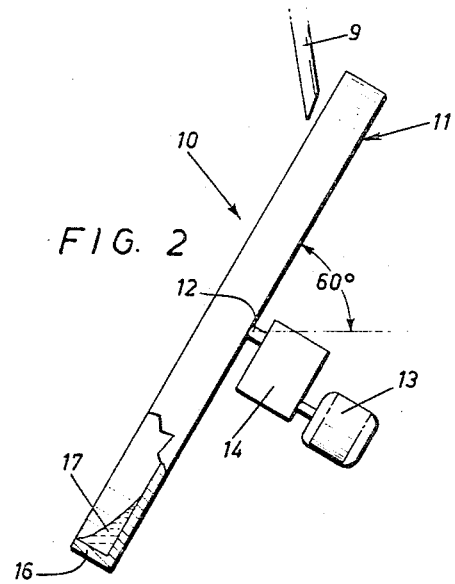
FIGURE 2 is a side elevation, partly in section, illustrating the angle of inclination of the pan.
Figure 3:
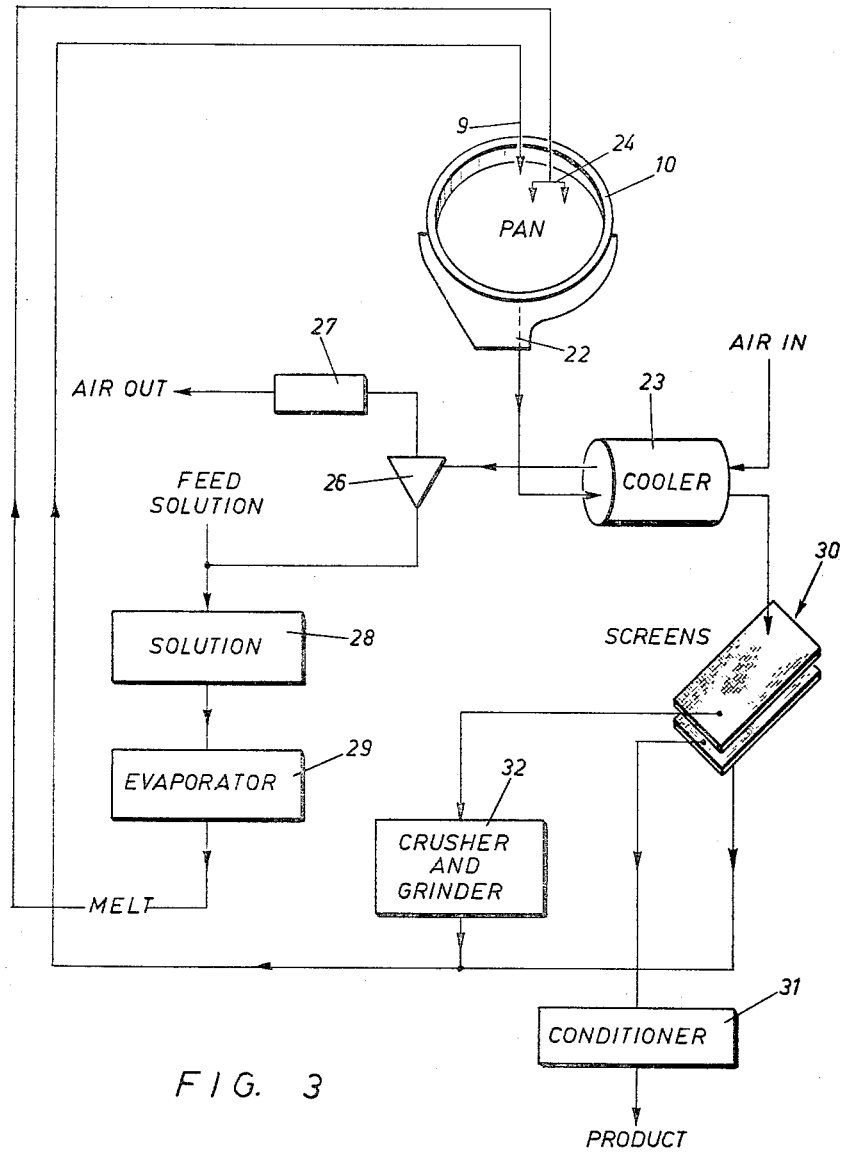
FIGURE 3 is a schematic illustration of the process of the present invention.

With reference to the drawing, the process of the invention illustrated schematically in FIGURE 3 comprises discharging solid nuclei or particles of nitrogenous compounds such as urea or ammonium nitrate in the size range of, for example, from about minus 8 to about plus 28 mesh, Standard Tyler Screen, by means of hopper 9 onto the upper central quadrant of an inclined rotating pan or disc 10 as illustrated in detail in FIGURES 1 and 2. Pan 10 consists of a circular plate 11 rotatably mounted at its axis, by means of a stub shaft 12, in a plane inclined at about 60° to the horizontal. Plate 11 is adapted to be rotated in a clockwise direction, as viewed in FIGURE 1, by a motor 13 and a gear reducer 14 secured to stub shaft 12, at a suitable rate, for example, of from 20 to 40 r.p.m. (revolutions per minute). It will be understood that the angle of inclination of plate 11 to the horizontal and the rate of rotation of plate are believed not critical in the operation of the process and the above angle of inclination and rates of rotation are illustrative only of the operation of pan 10. However, if the angle of inclination is increased, it may be necessary to increase the rate of rotation to ensure that a uniform layer is maintained in the zone of fast moving particles in the upper section of the plate.

Pan 10 has a rim 16 secured normal to plate 11 about its periphery which is adapted to retain a crescent-shaped bed of solids 17, said bed lying in the lower left quadrant of plate 11 when the pan is rotated. A scraper blade 18 is adapted to radially traverse plate 11 from its centre to its periphery about ⅛ inch above the surface of plate 11 in the lower right quadrant of said plate as viewed in FIGURES 1 and 3. Scraper 18 is slidably mounted on member 34 which is positioned above plate 11 and is reciprocated across the face of plate 11 by a threaded rod 35 journalled at each end in member 34 for rotational movement. Rod 35 can be rotated manually or by a motor for continuous reciprocal travel of scraper 18. A deflector 19 secured to one end of member 34 is provided in the upper left quadrant of said plate.

The particles charged to the pan are carried clockwise by plate 11 into the sloping bed 17 of granules wherein classification of the granules takes place. The large particles contained in the bed are carried to the upper surface of the bed by the tumbling motion of the particles in the bed and are discharged by gravity over the lip of rim 16 onto apron 21 and into hopper 22 and are conveyed to cooler 23, as illustrated in FIGURE 3. Undersized particles at the bottom of bed 17 are carried clockwise out of the bed by the rotation of plate 11 and are deflected inwardly by deflector 19 to join the particles charged by hopper 9 and form a zone of fast moving particles diametrically opposite to the sloping bed. In this zone, the particles form a closely packed uniformly shallow layer of from about ½ inch to about ¾ inch in thickness which extends under spray nozzles 24 which are spaced from but directed towards the shallow layer on the face of the pan. A molten, substantially anhydrous nitrogenous compound such as urea or ammonium nitrate, having a concentration of at least about 99% and a temperature of from about 5 to 15 centigrade degrees above its respective crystallization temperature, is passed from evaporator 29 to sprays 24 and is sprayed onto the particles in said shallow layer. The deflector 19 helps to ensure the formation of a uniform layer of granules in the region of the sprays by directing particles away from the periphery of the pan to mix with the cooled particles charged to the pan from hopper 9.

We have found that the use of two spray nozzles 24 positioned as indicated in FIGURE 1, i.e., in the upper right quadrant, and spaced horizontally on five-inch centres about 8 to 12 inches from the pan provides satisfactory result with a pan of 39 inch diameter as described in example hereinbelow. The spray nozzles were placed as close to feed hopper 9 as possible without interference with the flow of the solid feed. The pressure of the molten nitrogenous compound fed to nozzles 24 varied from about 25 p.s.i. to about 28 p.s.i. for nitrate, and from about 40 p.s.i. to about 45 p.s.i. for urea. Pressures of from about 200 p.s.i. to about 45 p.s.i. are generally satisfactory for either nitrogenous compound provided that the melt is sprayed in finely divided form.

According to the process of the United States patents noted above, the sprayed liquid is fed to a slow moving region where the particles remain during most of the pelletizing operation before passing to a faster moving region. In our process, melt is sprayed onto the faster moving particles, and spraying onto the slower moving particles is deliberately avoided.

We have found that optimum results are obtained when the melt is sprayed onto a closely packed shallow layer of granules of uniform thickness while the granules are moving at a maximum velocity across the face of the pan 10 under the conditions stated hereinabove. The finely divided molten material impinges on the particles and immediately spreads about the surface of the particles, aided by the rolling movement of the particles, and crystallizes to form a concentric layer or stratum of solidified material on each particle.

Spraying of the melt onto the granules in the slow moving section of the bed in the pan, that is, in the area of the left lower quadrant viewed in FIGURE 1 results in excessive agglomeration occurring. The size increase of granules is then attributable to the adherence together of two or more particles, rather than to the formation of fresh concentric layers or strata of material upon each particle. The agglomeration of several particles to form an individual granule is not objectionable in some processes using pan granulation, e.g. in the treatment of powdered ores and phosphate fertilizers, but is undesirable for the production of urea and ammonium nitrate which preferably are marketed in the form of spherical granules of uniform size. It is difficult to control the size range of the granules if the particles stick together, particularly where the feed is not in the form of fine powder but is in the form of undersized particles and crushed material.

The temperature at which the granules are discharged from the pan is preferably about 40 to 70 centigrade degrees below the crystallization temperature of the nitrogenous compound; that is, about 70° C. to about 90° C. for urea, and about 90° C. to about 110° C. for ammonium nitrate. The granules are sufficiently solid and strong within this preferred temperature range to withstand subsequent conveying and resulting attrition without disintegrating. Also, the granules are sufficiently warm to retain a degree of plasticity such that the tumbling motion occurring during passage through the cooler rounds any angular corners and edges of the granules to produce a more spherical shape.

Granules generally within the size range of from about minus 6 plus 14 mesh, Standard Tyler Screen, are discharged over pan rim 16 into hopper 22 and directed to drum cooler 23 wherein the granules are cooled preferably to at least within the range of from about 50° C. to about 70° C. by a current of cooling air flowing countercurrent to the direction of travel of the granules. The exhaust air is passed through a cyclone 26 and scrubber 27 before being discharged to the atmosphere, for removal and collection of entrained solids and the collected solids are passed to a solution tank 28 wherein the solids are dissolved and the resulting solution passed to evaporator tank 29 wherein the solution is concentrated to at least 99% concentration.

The cooled granules are passed to vibrating screens 30 which yield product granules within a predetermined size range which travel to conditioner unit 31 for application of an anti-caking material such as diatomaceous earth, clay or the like and are subsequently bagged or passed to storage. Oversized material is passed to a crusher and grinder unit 32 for size reduction to the range of minus 14 plus 28 mesh and combined with minus 14 mesh material from screens 30 for recycling via hopper 9 to pan 10.

The amount of solid material recycled to the pan can be varied. The recycle ratio, that is, the ratio of the weight of recycled material to the weight of product, preferably is maintained within the range of about 0.9:1 to 3:1, although it may be as high as 4:1 or more for short periods of time.

The amount of recycled material, or the recycle ratio, is important in the operation of the process. For example, if the pan discharge temperature becomes too low so that the product is too angular, the recycle ratio should be reduced thereby reducing the amount of cool solid material fed to the pan and allowing the temperature of the discharged granules to rise. If the pan discharge temperatures becomes too high, the ratio should be increased, allowing the temperature to fall. Thus, the recycle ratio is varied to control the temperature of the solids on the pan and hence the rate of solidification of molten material sprayed onto the solid particles.

Urea and ammonium nitrate granules were produced according to the present process in a circular pan 10 having a diameter of 39 inches and a peripheral rim height of 7¼ inches. The pan was inclined at 60° to the horizontal and rotated at 36 r.p.m. for the production of urea granules and 28.5 r.p.m. for the production of ammonium nitrate granules. Particles of undersized material from the bed 17 were deflected across the pan face to join particles charged by hopper 9 to form in the zone opposite to the bed a closely packed layer of granules of from about ½ inch to about ¾ inch in thickness.

The urea melt at 99.5% concentration and 145° C., having a crystallization temperature of 132° C., was sprayed onto the particles by sprays 24 operating under a 45 p.s.i. fluid pressure at a rate of 15.6 pounds per minute. The sprays were of the solid cone type with a spray angle of 48°, and were spaced 12 inches from the material in the pan. The recycled material (crushed and like undersized particles) was fed to the pan at 40.5 pounds per minute (an average ratio of 2.8:1 relative to the production rate which averaged 14.5 pounds per minute). The pan discharge temperature was controlled at an average of about 80° C. and the recycled particles were charged at a temperature of about 15° C. The size range of the pan feed and discharge particles for the production of urea granules are shown in Table I hereinbelow.

TABLE I

| Mesh Size (Standard Tyler) | Solid Feed To Pan | Pan Discharge |
|---|---|---|
| +6 | | 21.4 |
| +8 | 0.6 | 87.8 |
| +10 | 67.7 | 96.0 |
| +12 | 85.9 | 98.5 |
| +14 | 93.5 | 99.9 |
| +20 | 99.1 | |

In a test in which hardness is measured by determining the weight in grams required to crush 50% of the particles in a sample, the figures for urea granules produced by the present process varied from about 1200 grams to 1550 grams, whereas the figure for urea prills produced by a conventional prilling process was about 600 grams. The concentration of the sprayed urea in each process was about 99.5%.

The ammonium nitrate melt at 99.5% concentration and 178° C., having a crystallation temperature of 163° C., was sprayed onto the particles by sprays 24 operating under a fluid pressure of 25 p.s.i. at a rate of 17.0 pounds per minute. The sprays were of the solid cone type with a spray angle of 48°, and were spaced 8 inches from the material in the pan. The recycled material (crushed and undersized particles) was fed to the pan at 13 pounds per minute (an average ratio of 0.9:1 relative to the production rate which averaged 14.5 pounds per minute). The pan discharge temperature was maintained at an average of about 121° C. and the recycled particles were charged at a temperature of about 65° C. The size range of the pan feed and discharge particles for the production of ammonium nitrate granules are shown in Table II hereinbelow.

TABLE II

| Mesh Size (Standard Tyler) | Solid Feed To Pan | Pan Discharge |
|---|---|---|
| +6 | 0 | 5.1 |
| +8 | (¹) | 41.8 |
| +10 | 37.0 | 86.5 |
| +12 | 64.5 | 93.2 |
| +14 | 75.2 | 95.1 |
| +20 | 90.2 | 97.3 |

¹ Traces.

The urea and ammonium nitrate granules produced according to the method of the present invention contained less than 0.5%, by weight, moisture after the conditioning step and were harder and coarser and had greater strength characteristics than granules produced according to other techniques.

It will be understood, of course, that modifications can be made in the preferred embodiment of the invention described and illustrated herein without departing from the scope of the invention as defined by the appended claims.

What we claim as new and desire to protect by Letters Patent of the United States is:

1. In a pan granulation process for the production of granules of nitrogenous compounds which includes the steps of forming a sloping, slow moving bed of solid particles in a lower portion of an inclined circular granulating pan inclined at substantially about 60° from the horizontal rotating on its axis and discharging granules of relatively large size from the upper surface of said bed, the improvement which comprises the steps of rotating said pan at a rate sufficient to withdraw relatively small particles from said bed upwardly on the face of said pan and to deflect said particles across the face of said pan into a zone of fast moving solid particles on said face and substantially diametrically opposed to said bed; continuously feeding cooled solid particles onto the face of said inclined pan at the top thereof to enter said zone and to combine with said withdrawn particles to form in said zone a uniformly shallow layer having a thickness of about ½ to about ¾ of an inch of closely packed particles; spraying a molten, substantially anhydrous nitrogenous compound at from about 5 to 15 centigrade degrees above its crystallization temperature onto said layer of closely packed particles on the face of said pan in the said zone of fast moving particles; and controlling the rate of feed of cooled solid particles to said zone and the rate of discharge of granules from the said bed to ensure a bed temperature of from about 40 to 70 centigrade degrees below the crystallization temperature of the nitrogenous compound.

2. In a pan granulation process according to claim 1, cooling said discharged granules to at least about 50 to 70° C.; screening said cooled granules and collecting granules within a predetermined size range as product; crushing oversize granules; and returning crushed particles from said crushing step together with undersize granules from said screening step to the zone of fast moving solid particles on the face of said inclined circular pan as said cooled solid particles.

3. A pan granulation process according to claim 2 in which said molten, substantially anhydrous nitrogenous compound is urea.

4. A pan granulation process according to claim 3 in which said molten, substantially anhydrous nitrogenous compound is ammonium nitrate.

5. A process as claimed in claim 4 in which the ratio of the weight of cooled particles passed to said zone of fast moving solid particles to the weight of granules collected as product is within the range of from about 0.9:1 to about 3:1.

6. In a pan granulation process for the production of granules of nitrogenous compounds which includes the steps of forming a sloping, slow moving bed of solid particles in a lower portion of an inclined granulating pan inclined at substantially about 60° from the horizontal rotating about its axis, the improvement which comprises rotating said pan at a rate sufficient to withdraw relatively small particles upwardly from said bed and deflect said withdrawn particles into a zone of fast moving solid particles formed on said inclined pan substantially diametrically opposed to said slow moving bed; continuously feeding cooled solid particles onto the face of said pan at the top thereof to enter said zone to combine with said withdrawn particles to form in said zone a uniformly shallow layer of from about ½ inch to about ¾ inch thickness of closely packed particles; spraying a molten, substantially anhydrous nitrogenous compound at from about 5 to 15 centigrade degrees above its crystallization temperature onto said layer of closely packed particles in said zone; discharging granules of relatively large size from the upper surface of the sloping, slow moving bed; controlling the rate of feed of particles to said zone and discharge of granules from said slow moving bed to obtain a bed temperature of from about 40 to 70 centigrade degrees below the crystallization temperature of the nitrogenous compound; passing said discharged granules through a cooling zone countercurrent to a flow of cooling air for cooling said granules to at least about 50° C. to 70° C.; screening said cooled granules and collecting granules within a predetermined size range as product; crushing oversized granules and returning crushed particles from said crushing step together with undersized granules from said screening step to the zone of fast moving solid particles as said cooled solid particles; collecting particle fines entrained in the cooling air and dissolving said fines in a solution of the nitrogenous compound; and concentrating said solution to provide a substantially anhydrous melt of said nitrogenous compound of at least 99% concentration.

References Cited

UNITED STATES PATENTS

| | | | |
|---|---|---|---|
| 2,561,055 | 7/1951 | Hood | 23—313 |
| 2,436,766 | 2/1948 | Davis | 23—313 |
| 2,627,457 | 2/1953 | Kevley | 23—313 |
| 3,211,522 | 10/1965 | Shurton | 23—313 |

NORMAN YUDKOFF, *Primary Examiner.*

G. P. HINES, *Assistant Examiner.*